(12) United States Patent
Nothum, Jr.

(10) Patent No.: US 9,642,493 B2
(45) Date of Patent: May 9, 2017

(54) FRYER CABINET THERMAL OIL HEAT EXCHANGE

(71) Applicant: Robert G. Nothum, Jr., Willard, MO (US)

(72) Inventor: Robert G. Nothum, Jr., Willard, MO (US)

(\*) Notice: Subject to any disclaimer, the term of this patent is extended or adjusted under 35 U.S.C. 154(b) by 330 days.

(21) Appl. No.: 14/496,515

(22) Filed: Sep. 25, 2014

(65) Prior Publication Data
US 2015/0082997 A1   Mar. 26, 2015

Related U.S. Application Data

(60) Provisional application No. 61/882,075, filed on Sep. 25, 2013.

(51) Int. Cl.
A47J 37/12 (2006.01)

(52) U.S. Cl.
CPC ....... *A47J 37/1214* (2013.01); *A47J 37/1233* (2013.01); *A47J 37/1242* (2013.01); *A47J 37/1247* (2013.01); *A47J 37/1223* (2013.01)

(58) Field of Classification Search
CPC ............... A47J 37/1214; A47J 37/1233; A47J 37/1242; A47J 37/1247
USPC .......................................... 99/404, 405, 406
See application file for complete search history.

(56) References Cited

U.S. PATENT DOCUMENTS

| 1,760,979 A | 6/1930 | Ferry .............................. 99/405 |
| 2,546,163 A * | 3/1951 | McBeth .............. A47J 37/1214 126/391.1 |
| 2,833,203 A | 5/1958 | Benson et al. ................... 99/404 |
| 3,203,341 A * | 8/1965 | Hedgepeth .......... A47J 37/1214 99/330 |
| 3,309,981 A | 3/1967 | Benson et al. ................... 99/407 |
| 3,376,806 A | 4/1968 | Magnusson ..................... 99/408 |
| 3,635,149 A | 1/1972 | Smith et al. ..................... 99/404 |
| 3,688,683 A | 9/1972 | Boggs ............................. 99/330 |
| 3,690,895 A * | 9/1972 | Amadon et al. ......... A23L 19/19 426/439 |
| 3,757,672 A | 9/1973 | Szabrak et al. ................. 99/404 |
| 4,187,771 A | 2/1980 | Westover et al. ............... 99/404 |

(Continued)

OTHER PUBLICATIONS

PCT International Search Report. Appln. No. PCT/US2014/057412 Date of Mailing: Dec. 23, 2014.

(Continued)

*Primary Examiner* — Reginald L Alexander
(74) *Attorney, Agent, or Firm* — Jonathan A. Bay

(57) ABSTRACT

A hot oil fryer for continuous frying duty in continuous food process lines has a frame, a cooking channel carried by the frame, a conveyor through the cooking channel having an upper food product carrying-run and a lower return runs, a bed of elongated heat exchanger tubes inside the cooking channel for circulating a thermal fluid, and a combustion-fired thermal oil heater supported by the frame off the floor for heating the thermal fluid which is circulated through the bed of elongated heat exchanger tubes. Preferably the cooking channel is elongated, as also preferably is the combustion-fired thermal oil heater carried, which is laid down to extend along a horizontal axis underneath the cooking channel. The combustion-fired thermal oil heater is fed either fuel-oil or a fuel-gas for combusting therein.

8 Claims, 5 Drawing Sheets

(56) References Cited

U.S. PATENT DOCUMENTS

| | | | | |
|---|---|---|---|---|
| 4,346,649 | A | | 8/1982 | Wilke et al. .................... 99/337 |
| 4,478,140 | A | | 10/1984 | Bullock .......................... 99/404 |
| 4,584,931 | A | | 4/1986 | Feehan ........................... 99/355 |
| 4,628,804 | A | | 12/1986 | Belshaw et al. ................. 99/404 |
| 4,744,293 | A | * | 5/1988 | Shimokawa ........ A47J 37/1214 |
| | | | | 99/330 |
| 4,852,475 | A | | 8/1989 | Yang ............................... 99/404 |
| 4,913,042 | A | | 4/1990 | Miller ............................. 99/404 |
| 5,074,199 | A | | 12/1991 | Miller ............................. 99/404 |
| 5,253,567 | A | | 10/1993 | Gunawardena ................. 99/404 |
| 5,476,034 | A | * | 12/1995 | Lygum ................ A47J 37/1247 |
| | | | | 126/391.1 |
| 5,540,215 | A | * | 7/1996 | Fritzsche ............ A47J 37/1233 |
| | | | | 126/374.1 |
| 5,570,626 | A | | 11/1996 | Vos ................................. 99/404 |
| 6,305,274 | B1 | * | 10/2001 | Nothum, Sr. ....... A47J 37/1214 |
| | | | | 99/330 |
| 8,464,635 | B1 | | 6/2013 | Sprinkle et al. ................ 99/404 |
| 2013/0180411 | A1 | | 7/2013 | Hsieh ............................. 99/404 |

OTHER PUBLICATIONS

PCT Written Opinion. Appln. No. PCT/US2014/057412 Date of Mailing: Dec. 23, 2014.
Online Brochure. Thermal Fluid Heaters of GTS Energy Corporation Accessed Oct. 16, 2014 http://www.gtsenergy.com/wp-content/uploads/2012/07/Thermal-Fluid-Heaters.pdf.
Pentair Minimax CH 250.000 BTU Swimming Pool Heater for sale on amazon.com. Accessed Oct. 16, 2014 http://www.amazon.com/Pentair-Minimax-Swimming-Pool-Heater/dp/B00355SIDS.

* cited by examiner

FRYER CABINET THERMAL OIL HEAT EXCHANGE

CROSS-REFERENCE TO PROVISIONAL APPLICATION(S)

This application claims the benefit of U.S. Provisional Application No. 61/882,075, filed Sep. 25, 2013, the foregoing disclosure for which is incorporated herein by this reference thereto.

BACKGROUND AND SUMMARY OF THE INVENTION

The invention generally relates to hot oil fryers for the continuous hot oil frying of large quantities of food products as in large scale food process lines. More particularly, the invention relates to such a hot oil fryer which is combined with thermal oil heating and heat exchange housed within or attached to the same cabinet as for the bath for the frying oil.

This application is commonly-invented in part with U.S. Pat. No. 6,305,274, entitled "FRYER FOR FOOD PROCESS LINES," which document is incorporated herein in its entirety.

Nowadays, some hot oil fryers for large-scale food process lines have oil baths for the frying oil that might measure about thirty feet (~9 m) in length and sixty inches (~1½ m) wide. Whereas the foregoing represents a relatively large model of such continuous fryers for large-scale food process lines, the matter of 'scale' in the matters of large-scale food process processing is a separate matter.

FIG. 1 is a schematic showing selected equipment for a very-large scale food processing factory. This factory is running (for example and without limitation) at least three large-scale food process lines. Each one of the three lines requires its own dedicated large-scale hot oil fryer. The first fryer has—for the sole purpose only of heating the frying oil in the frying oil bath—a rated power draw of one million BTU/hr (~1,000,000 kJ/hr, or kilo-joules per hour). The middle fryer has a corresponding rated power draw for the same purpose of a half million BTU/hr (~500,000 kJ/hr). The furthest fryer has a rated power draw for heating the frying oil only of eight hundred thousand BTU/hr (~8000,000 kJ/hr)(wherein a BTU and a kJ are approximately equal in value).

FIG. 1 is furthermore typical of the prior art for not only (merely) large scale but also 'very' large scale food processing operations. That is, the frying oil in the fryers in indirectly brought up to heat by an intermediate medium, namely, thermal oil.

Frying oil these days is predominately any of a number of vegetable-based cooking oils, most which can be found in home kitchen (whereas fat or lard and the like have long fallen out of disfavor). Thermal oil is more akin to engine oil. It is not suitable for human consumption.

FIG. 1 shows that a combustion-fired thermal oil heater is the original source of the power output for the heating the frying oils of all three fryers. The combustion-fired thermal oil heater combusts either a gas like propane (eg, a liquified petroleum gas, or LPG) and compressed natural gas (eg., CNG) or else a fuel oil like kerosene and so on. In other words, typical combustion-fired thermal oil heaters runs on a suitable gas or fuel-oil fuel. The options everyday are growing, with the greatest increase in options nowadays being led by biofuels and the like.

Suitable combustion-fired thermal oil heaters are available from and without limitation GTS Energy of Norman, Okla. and Marietta, Ga. Power outputs of suitable combustion-fired thermal oil heaters range anywhere from between and without limitation four hundred thousand BTU/hr (~400,000 kJ/hr) and seventy-five million BTU/hr (~75,000,000 kJ/hr).

In FIG. 1, the preferred combustion-fired thermal oil heater has a rated output of three and one-half million BTU/hr (~3,500,000 kJ/hr). In other words, the preferred combustion-fired thermal oil heater has a little excess capacity for the maximum power draw of all three fryers running at full blast at the same time, or, three million three hundred thousand BTU/hr (~3,300,000 kJ/hr).

Indeed, the excess capacity is probably needed for heating losses along the system. As FIG. 1 shows, it is popular to site the combustion-fired thermal oil heater outside of the factory, and plumb the conduits carrying the heated thermal oil to each of the three fryers. It is typical that any or all of the fryers can be as far as two hundred feet (~60 m) distant.

Inefficiencies arise when the factory of FIG. 1 has changed its business operations such that it will never again ever run the first and the further fryers (ie. , the two fryers with the higher power draws). Whatever food product was being produced by those lines is being discontinued, and is presumptively never going to be re-introduced.

The factory of FIG. 1 is left in the following predicament. It has a combustion-fired thermal oil heater with a power output (three and a half million BTU/hr or 3,500,00 kJ/hr) rated at seven times the power draw of the sole half million BTU/hr (~500,000 kJ/hr) fryer left running.

The largest corporations may not care. But niche food companies specializing in healthy alternatives will likely be only frying less food product in the future even if their food-product output grows. This already seen in potato chips and corn chips wherein the offering are any of fried, kettle-cooked, baked and so on.

It is likely that a lot of food product will always be fried in the future. It is also believed that many food company's really do not want excess capacity with combustion-fired thermal oil heating, in the belief that, the demand for that excess will not be returning.

What is needed is improvements which overcome the shortcomings of the prior art in the matters of combustion-fired thermal oil heating for indirect heating of the frying oil for hot oil fryers used in continuous hot oil frying of large quantities of food products as in large scale food process lines.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

FIGS. 2 through 5 show a hot oil fryer in accordance with the invention which is combined a with thermal oil heating and heat exchange housed within or attached to the same cabinet or fame as for the bath for the frying oil.

Figure 1:
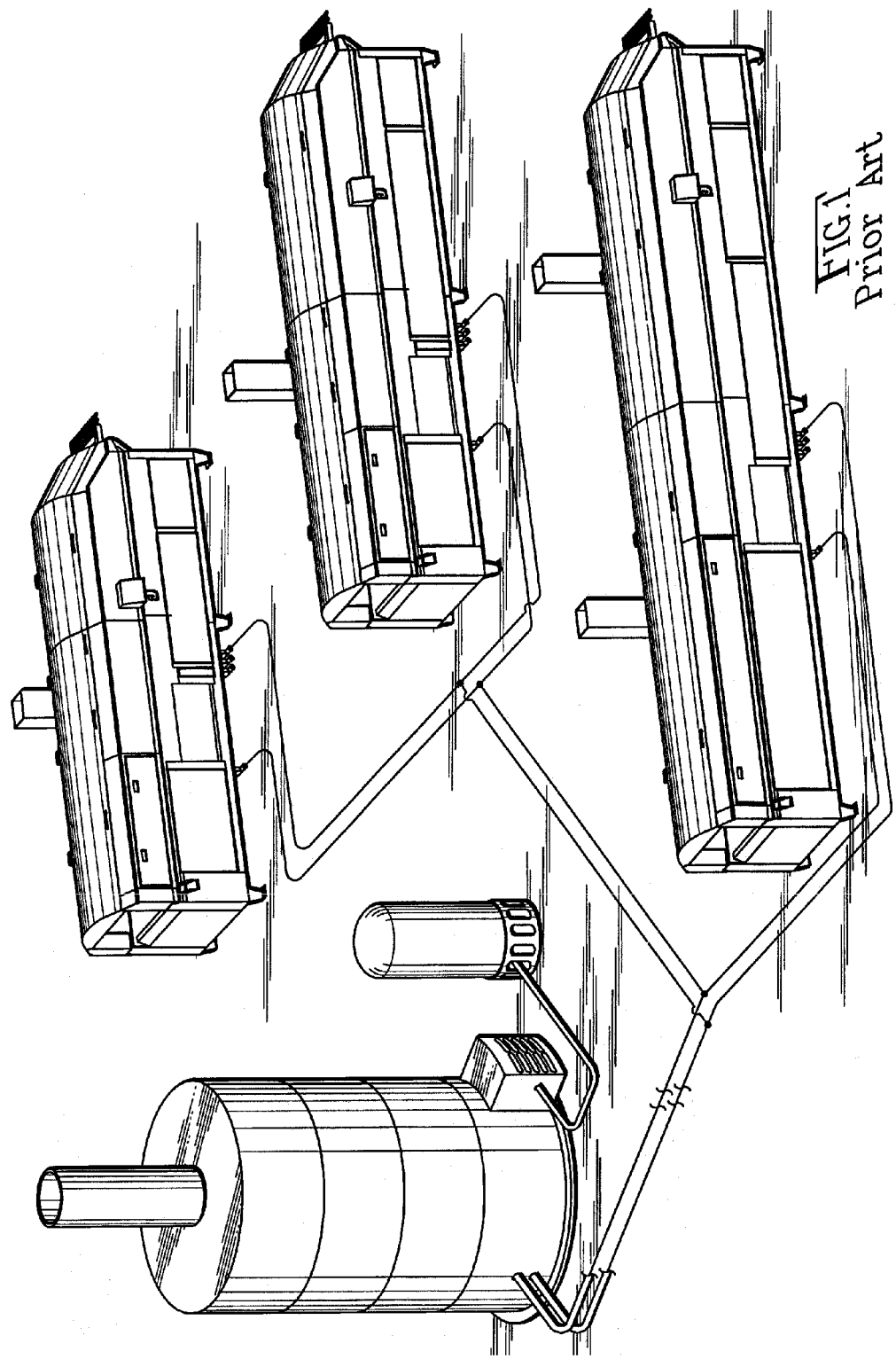
FIG. 1 is a schematic view of a (very) large scale food processing factory in accordance with the prior art.
Figure 2:
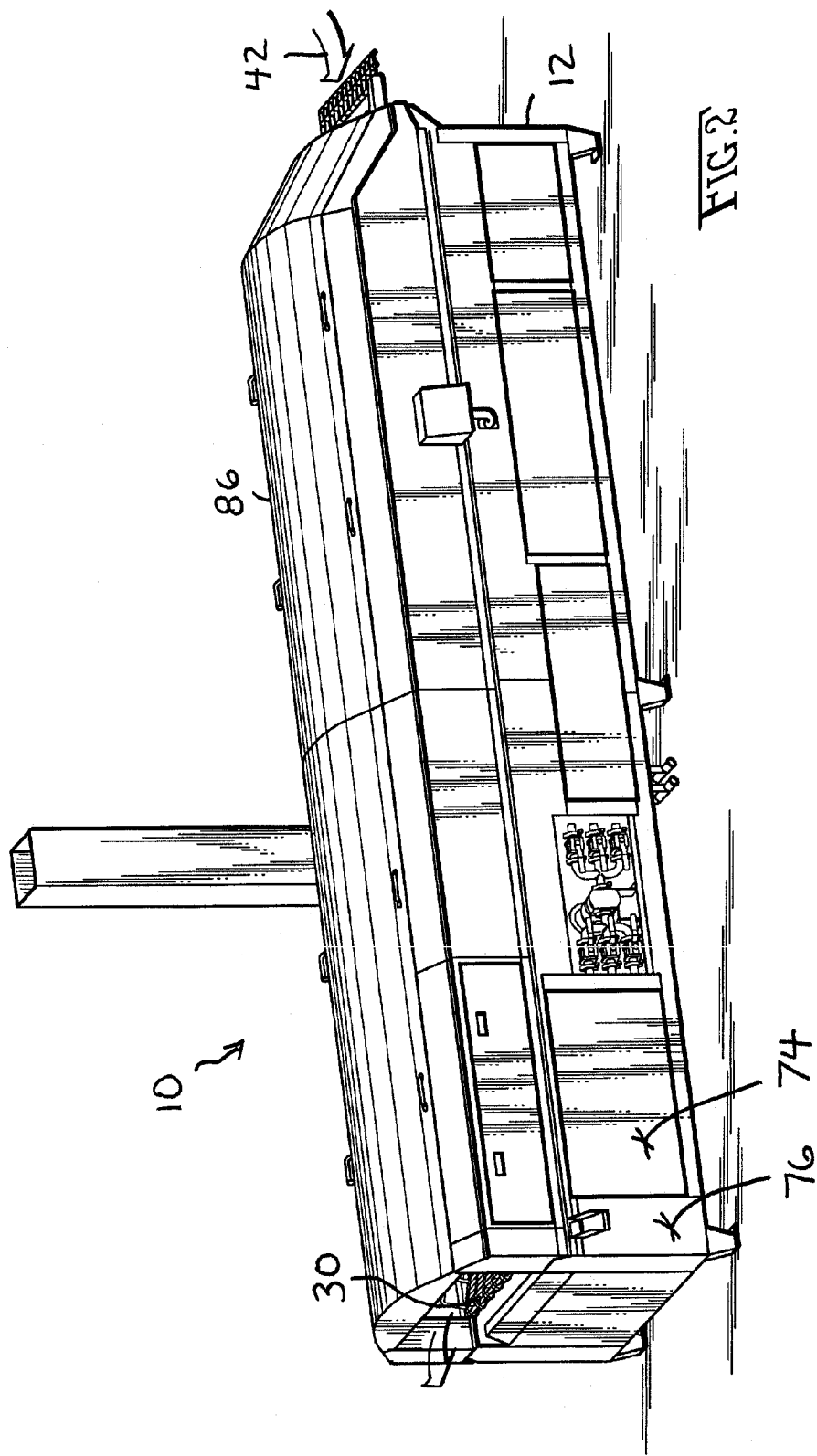
FIG. 2 is a perspective view of a hot oil fryer in accordance with the invention which is combined with thermal oil heating and heat exchange housed within or attached to the same cabinet as for the bath for the frying oil.

It is an aspect of the invention to combine a fryer for food process lines as disclosed in the above-referenced U.S. Pat. No. 6,350,274 with its own combustion-fired heat exchange provision for the thermal oil. FIG. 1 of the subject U.S. Pat. No. 6,350,274 shows that the heat source for the fryer is designated by reference numeral "44" and is external to the fryer cabinet.

In the combination fryer and thermal-oil heater in accordance with the invention, there are three (3) separate fluid systems, each which can be an "oil" but not realistically the same "oil" for any two of the three systems. These fluid systems are, namely:

the frying oil;
the thermal oil; and
the fuel oil (or gas, as in an LPG or CNG and so on).

(1) The frying oil, needless to say, is a food grade oil safe for human consumption, such as a vegetable oil or the like. Whereas the fryer includes a channel that can be referred to as the oil bath (ie., the bath of the frying oil), it is possible to substitute another cooking fluid for the frying oil including, without limitation, water (or no matter how highly disfavored these days, fat and lard or so on).

(2) The thermal oil is typically and additive-rich blend of a petroleum-based product, or else glycol-based product, aromatic chemical-based product or some other synthetic fluid. The additives can change about any kind of property to the basic fluid, including without limitation oxidation-resistance, corrosion-resistance, de-foaming agents, suspension agents and so on. A source for thermal oils (eg., heat transfer fluids) includes the Duratherm Heat Transfer Fluids company of Lewiston, N.Y.

(3) The fuel oil need not strictly be a light or heavy fuel oil but can alternatively be natural gas, a liquified petroleum gas (LPG), or perhaps a bio-gas. An electric-heated heater is not preferred because it is not believed to deliver the heat supply that is desired in such a compact package as is also desired.

Figure 3:
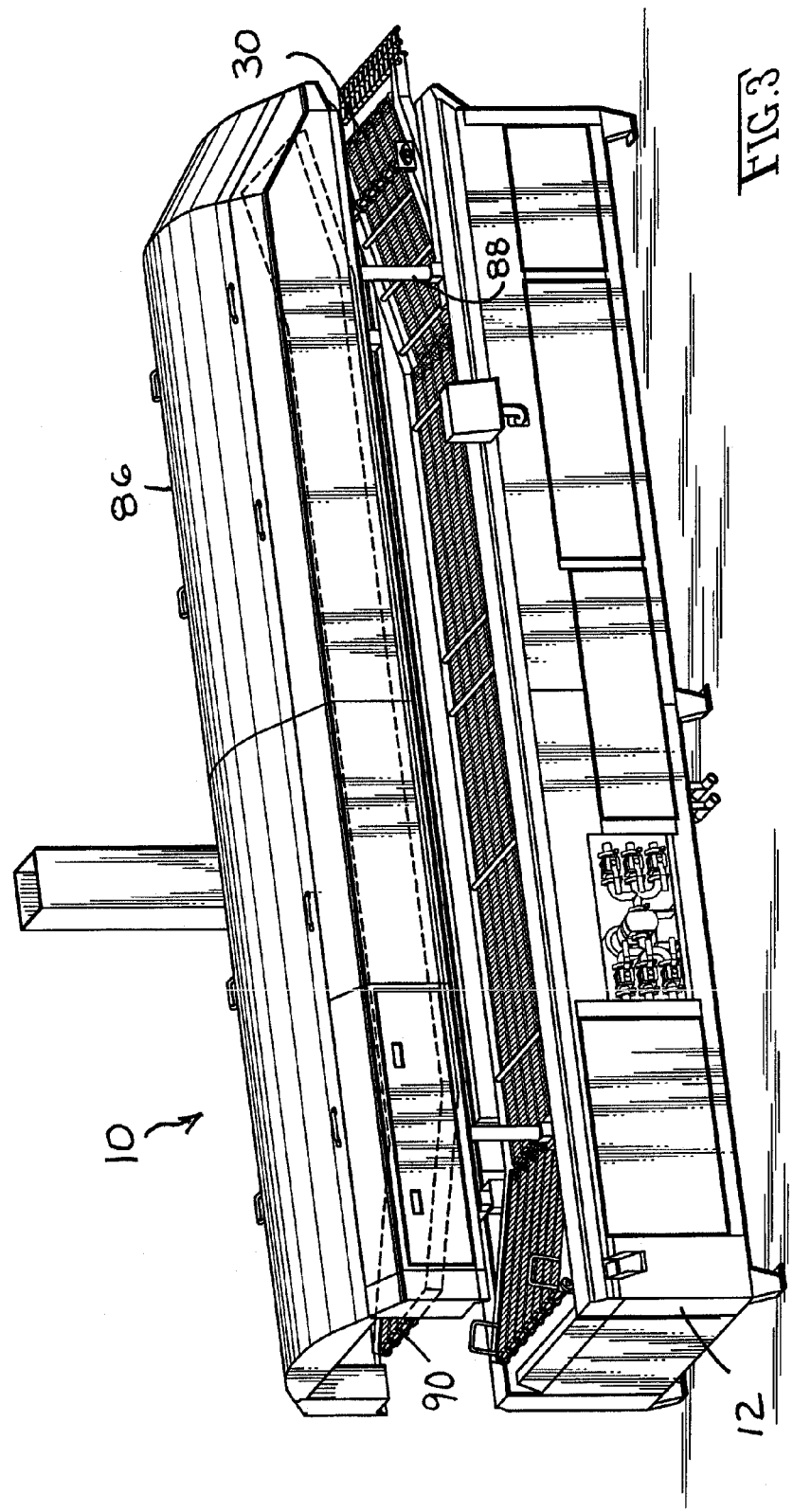
FIG. 3 is a perspective view comparable to FIG. 2 except showing the hood driven to an elevated non-use (eg., cleaning and/or maintenance) position.
Figure 4:
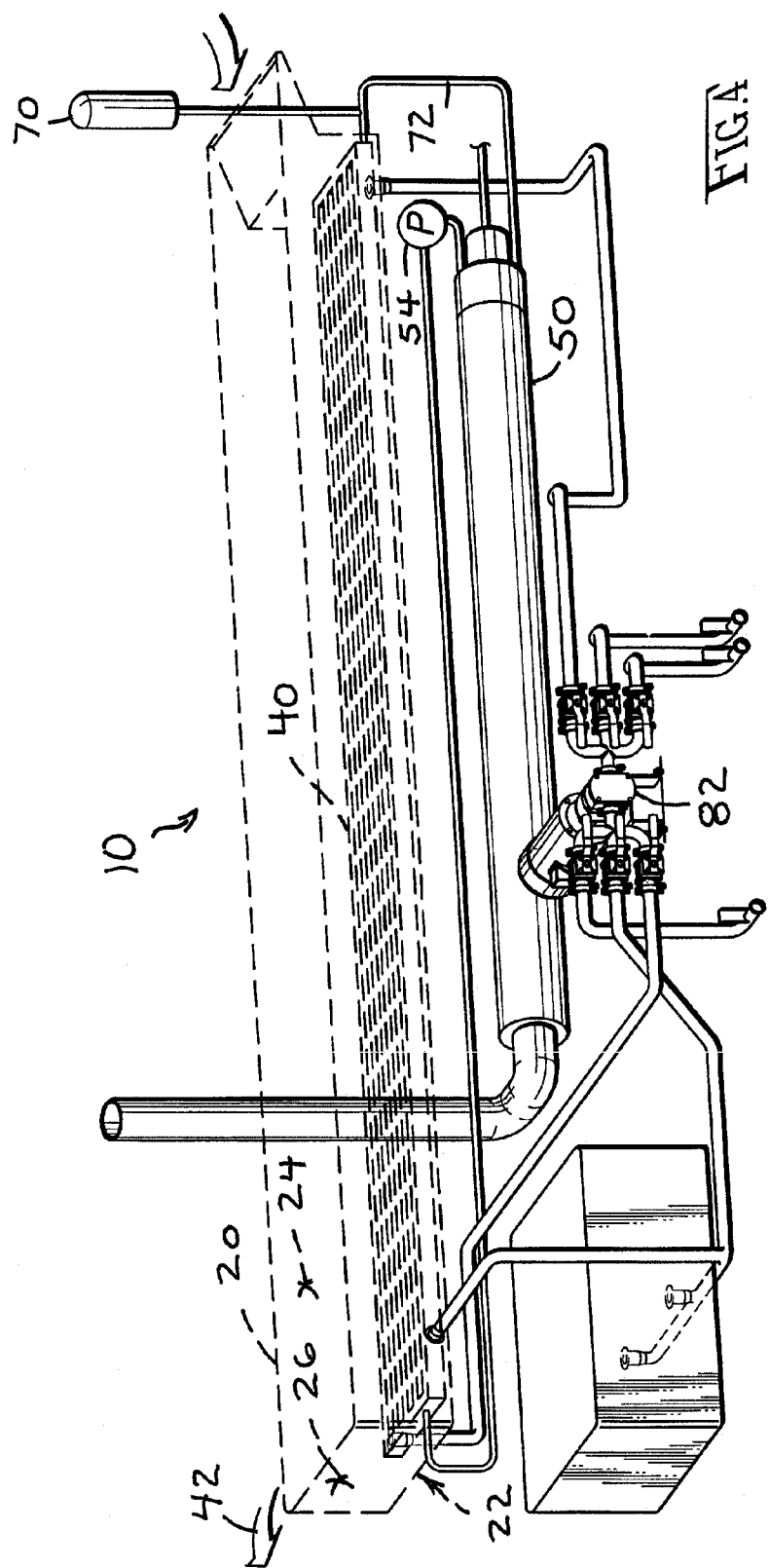
FIG. 4 is a 'perspective' schematic of the operative components of the hot oil fryer in accordance with the invention which is combined with thermal oil heating and heat exchange in or attached to the same cabinet as for the bath for the frying oil.
Figure 5:
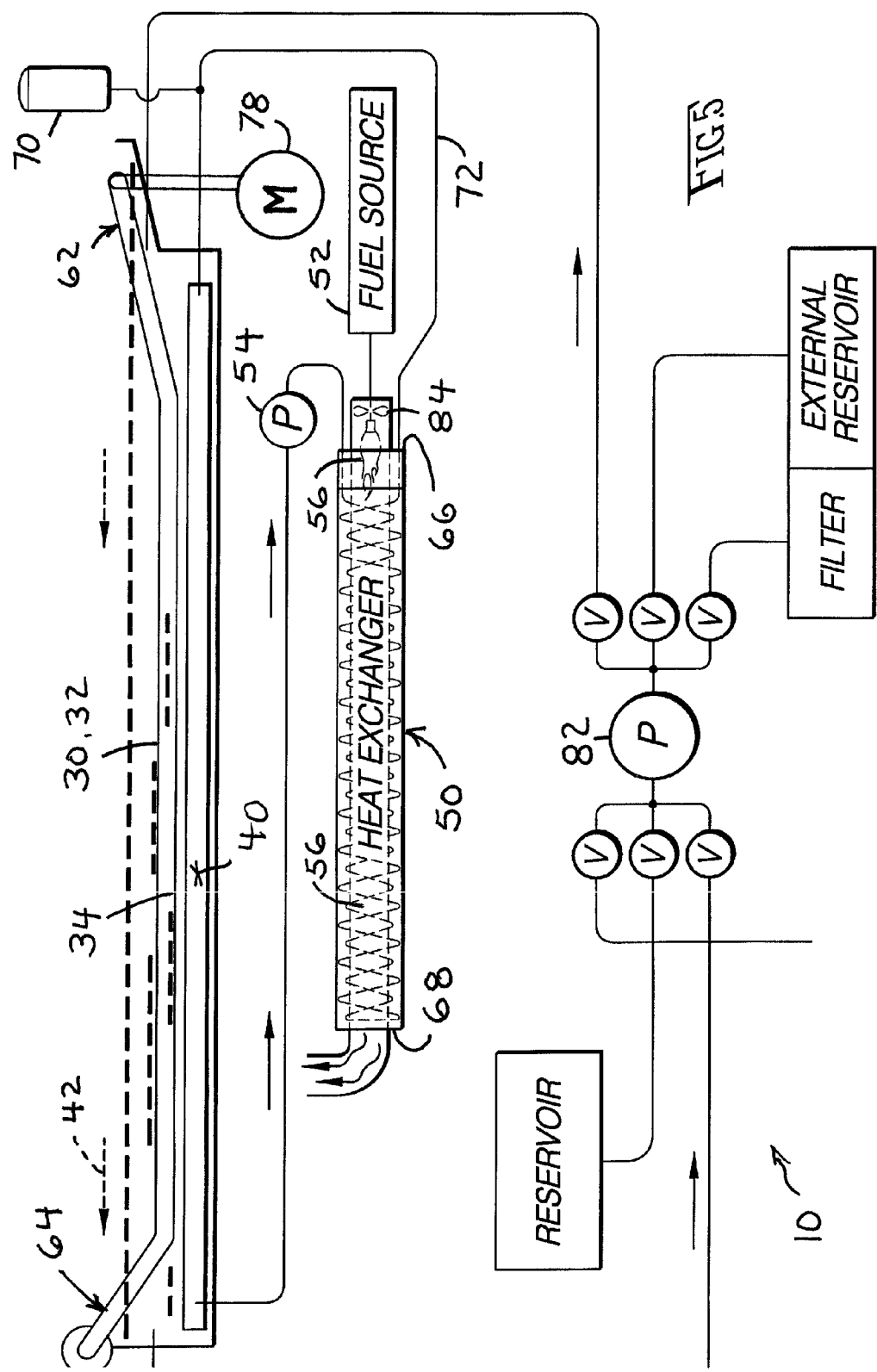
FIG. 5 is a schematic diagram of FIGS. 4.

FIGS. 3 and 5 show a horizontal thermal oil heater occupying a lower compartment of the hot oil fryer in accordance with the invention which is combined with thermal oil heating and heat exchange housed within or attached to the same cabinet as for the bath for the frying oil, while the oil-bath and food-product carrying conveyor belt occupies an upper compartment.

The horizontal thermal oil heater comprises and elongated, cylindrical combustion chamber extending between a burner end and an exhaust end. The combustion chamber is encircled with heat exchange tubes which carry the thermal oil. The heat exchange tubes preferably spiral around the cylindrical combustion chamber. Whereas the combustion chamber will likely be slightly hotter in the upper elevations than the floor thereof, the spiraling thermal oil will take on an average temperature (albeit a high temperature).

It is preferred to heat the thermal oil to anywhere as high as seven hundred degrees Fahrenheit (~370° C.). At the same time, it is also preferred to not pressurize the thermal oil in the conduits anywhere above the low head needed for circulation in the conduit loop therefor. That way, under current US regulations, the combustion-fired thermal oil heater need not be operated only by licensed boiler operators. In other words, it is safer.

The combustion-fired heater heats the thermal oil to operating temperature. The thermal oil is circulated between heat exchangers in the combustion-fired heater and heat exchangers in the frying oil to keep the frying oil to operating temperature. Food product transiting through the frying oil bath is cooked, needless to say, by the hot frying oil. But the discharged (and now cooked) food product also carries away energy from the frying oil bath, which depresses (eg., draws down) its temperature. Hence re-circulation of the thermal oil replaces the carried-away energy for the oncoming waves of incoming food product.

Again, it is an object of the invention to combine a fryer (as represented by U.S. Pat. No. 6,305,274) with its own combustion-fired, thermal oil heater in one cabinet, or at least mounted to one same frame (or stand). That way, what are ordinarily two pieces of equipment requiring separate floor space are combined in the footprint of the fryer alone.

The objects of and problems to be solved by the invention are provided according to a hot oil fryer 10 for continuous frying duty in continuous food process lines, comprising without limitation a frame 12 (or stand), a cooking channel 20 and a combustion-fired thermal oil heater 50. The frame 12 is elongated and is preferably welded or bolted to form a unitary unit for standing on a floor. The cooking channel 20 is likewise elongated and carried by the elongated frame 12 off the floor and has a bottom wall 22 between spaced sidewalls 24 and spaced end walls 26 for containing cooking oil to a given fill level.

There is also an elongated conveyor belt 30 that has an upper food-product carrying run 32 and a lower return run 34 disposed to traverse along the cooking channel 20 bottom wall 22. Wherein the elongated conveyor belt 30 is disposed in the cooking channel 20 such that at least a central span of both runs 32 and 34 can be sunk below the given fill level of the cooking oil.

There is moreover a bed of elongated heat exchanger tubes 40 arranged in spaced rows that extend parallel to the runs 32 and 34 of the conveyor 30. The bed of heat exchanger tubes 40 is interposed between the conveyor belt 30's upper and lower runs 32 and 34 such that the top sides of the tubes 40 cooperatively support the upper food-carrying run 32 against sagging and also cut-down the span between the source of heat flowing inside the heat exchanger tubes 40 and the sink of heat in the food product 42 that is transported on the food-carrying run 32.

The combustion-fired thermal oil heater 50 is another piece of structure that is supported by the frame 12 off the floor. The combustion-fired thermal oil heater 50 provides for heating of a thermal fluid which is circulated through the bed of elongated heat exchanger tubes 40. The combustion-fired thermal oil heater 50 is provided with a fuel-oil or fuel-gas fuel source for combusting in the combustion-fired oil heater 50. It is an aspect of the invention that the combustion-fired oil heater 50 heat the thermal fluid to a high temperature and whereby the thermal fluid heats the cooking oil to an intermediate temperature.

It is a further object of the invention to provide a circulation pump for circulating the thermal fluid at a low pressure that is marginally above ambient. In other words, the highest pressure inside the tubing 72 for the thermal fluid should be the head pressure for the thermal-fluid circulation pump 54, which pressure should certainly be between one and two atmospheres (eg., ambient pressure to somewhere not much more).

The high temperature for the thermal fluid might be around or about and without limitation 370° C. (~700° F.). The intermediate temperature for the cooking oil might be around or about and without limitation between 200° and 260° C. (~400° and 500° F.).

It is a further object of the invention that the combustion-fired thermal oil heater 50 is furthermore supported by the frame 12 not only off the floor but also underneath the cooking channel 20. It is another object of the invention that the combustion-fired thermal oil heater 50 comprises an elongated, cylindrical combustion chamber 56 which has a generally central axis therefor. That way, the combustion-fired thermal oil heater 50 is moreover supported by the frame 12 such that the generally central axis of the elongated, cylindrical combustion chamber 56 extends generally horizontally. Given that the conveyor 30 extends between a food-product intake end 62 and a food-product discharge end 64, and, the elongated, cylindrical combustion chamber 56 extends between a fuel input end 66 and a combustion gas exhaust end 68, then the following is further again another object of the invention. That is, the combustion-fired thermal oil heater 50 is additionally supported by the frame 12 such that the fuel input end 66 of the elongated, cylindrical combustion chamber 56 generally lies under the food-product intake end 62 of the conveyor 30. That way, thermal oil is outputted by the combustion-fired thermal oil heater 50 closest to where the thermal oil is first circulated into the bed of heat exchanger tubes 40 in the cooking channel 20, thereby minimizing the length of connecting tubing 72.

It is an additional object of the invention to provide an expansion chamber or riser pipe 70 for the thermal fluid which is vented to atmosphere at an elevation higher than not only combustion-fired thermal oil heater 50 but also the bed of heat exchanger tubes 40 between the upper and lower runs 32 and 34 of the conveyor belt 30.

It is an alternate object of the invention to provide cabinet panels 74 for attaching to the fame and form at least a semi-enclosed cabinet 76 for said cooking channel 20 and combustion-fired thermal oil heater 50. It would be preferable without limitation to do also all of the following. Namely, to house a conveyor drive system 78 for driving the conveyor 30 inside the cabinet 76. To do the same for a pump 54 for circulating the thermal fluid, that is, that this pump 54 be housed inside the cabinet 76. And do the same for another pump 82 for circulating the cooking oil, or once again, that this pump 82 be housed inside the cabinet 76 as well. And so on for a forced-air blower 84 for forcing combustion air through the combustion-fired thermal oil heater 50, that this blower 84 too either be housed inside the cabinet 76 or, if not, then be attached to the frame 12.

It is optional to provide a hood 86 for cooking channel 20, which would be supported by the frame 12 on lifting provisions 88 which are driven to cycle the hood 86 between elevated non-use (eg., maintenance) positions and a lowered use position.

It is furthermore optional but preferred to include a submerger system 90 (eg., a submerger conveyor belt) disposed directly above the main conveyor belt 30's food-product carrying run 32 in order to submerge food product 42 below the given fill level of the cooking oil during transit through the cooking channel 20.

It is another preferred object of the invention if the central span of the upper food-product carrying run 32 is flanked between a ramped-down inlet section and ramped-up outlet section for food product 42 to transit down below the given fill level of the cooking oil at the inlet section, then climb out at the outlet section. It is moreover preferred if this central span of the upper food-product carrying run 32 has a length between the inlet and outlet sections which is greater than both the inlet and outlet sections combined.

It is an alternative object of the invention that the lower return run 34 is disposed to traverse along the cooking channel 20 bottom wall 22 in order to motivate sediment in direction of one end of the cooking channel 20 (eg., the inlet end), and which end is adapted with a sediment disposal and/or filtration system.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A hot oil fryer for continuous frying duty in continuous food process lines, comprising:
   an elongated unitary frame for standing on a floor;
   an elongated cooking channel carried by the elongated frame off the floor and having a bottom wall between spaced sidewalls and spaced end walls for containing cooking oil to a given fill level;
   an elongated conveyor belt having an upper food-product carrying run and a lower return run disposed to traverse through the cooking channel, wherein the elongated conveyor belt is disposed in the cooking channel such that at least a central span of both runs can be sunk below the given fill level of the cooking oil;
   a bed of elongated heat exchanger tubes arranged in spaced rows that extend parallel to the runs of the conveyor and also sunk below the given fill level of the cooking oil;
   a combustion-fired thermal oil heater supported by the frame off the floor for heating a thermal fluid which is circulated through the bed of elongated heat exchanger tubes;
   a fuel-oil or fuel-gas fuel source for combusting in the combustion-fired oil heater;
   whereby the combustion-fired oil heater heat the thermal fluid to a high temperature and whereby the thermal fluid heats the cooking oil to an intermediate temperature;
   cabinet panels for attaching to said fame and forming at least a semi-enclosed cabinet for said cooking channel and combustion-fired thermal oil heater;
   a drive input system for driving the conveyor that is housed inside the cabinet;
   a pump for circulating the thermal fluid that is housed inside the cabinet;
   another pump for circulating the cooking oil that is housed inside the cabinet; and
   a forced-air blower for forcing combustion air through the combustion-fired thermal oil heater either housed inside the cabinet or attached to the frame.

2. The fryer of claim 1 further comprising:
a hood for cooking channel supported by the frame on lifting provisions which are driven between elevated non-use (eg., maintenance) positions and a lowered use position.

3. The fryer of claim 1 further comprising:
a submerger system disposed directly above the conveyor belt's food-product carrying run in order to submerge food product below the given fill level of the cooking oil during transit through the cooking channel.

4. The fryer of claim 1 wherein:
said central span of the upper food-product carrying run is flanked between a ramped-down inlet section and ramped-up outlet section for food product to transit down below the given fill level of the cooking oil at the inlet section, then climb out at the outlet section;
wherein the central span has a length between the inlet and outlet sections which is greater than both the inlet and outlet sections combined.

5. The fryer of claim 1 wherein:
the lower return run is furthermore disposed to traverse along the cooking channel bottom wall in order to motivate sediment in direction of one end of the cooking channel that is adapted with a disposal and/or filtration system.

6. A hot oil fryer for continuous frying duty in continuous food process lines, comprising:
an elongated unitary frame for standing on a floor;
an elongated cooking channel carried by the elongated frame off the floor and having a bottom wall between spaced sidewalls and spaced end walls for containing cooking oil to a given fill level;
an elongated conveyor belt having an upper food-product carrying run and a lower return run disposed to traverse through the cooking channel, wherein the elongated conveyor belt is disposed in the cooking channel such that at least a central span of both runs can be sunk below the given fill level of the cooking oil;
a bed of elongated heat exchanger tubes arranged in spaced rows that extend parallel to the runs of the conveyor and also sunk below the given fill level of the cooking oil;
a combustion-fired thermal oil heater supported by the frame off the floor for heating a thermal fluid which is circulated through the bed of elongated heat exchanger tubes;
a fuel-oil or fuel-gas fuel source for combusting in the combustion-fired oil heater;
whereby the combustion-fired oil heater heat the thermal fluid to a high temperature and whereby the thermal fluid heats the cooking oil to an intermediate temperature;
wherein the combustion-fired thermal oil heater is furthermore supported by the frame not only off the floor but also underneath the cooking channel;
wherein the combustion-fired thermal oil heater comprises an elongated combustion chamber which has a generally central axis therefor;
wherein the combustion-fired thermal oil heater is moreover supported by the frame such that the generally central axis of the elongated combustion chamber extends generally horizontally;
wherein the conveyor extends between a food-product intake end and a food-product discharge end;
wherein the elongated combustion chamber extends between a fuel input end and a combustion gas exhaust end; and
wherein the combustion-fired thermal oil heater is additionally supported by the frame such that the fuel input end of the elongated combustion chamber generally lies under the food-product intake end of the conveyor, whereby thermal oil is outputted by the combustion-fired thermal oil heater closest to where the thermal oil is first circulated into the bed of heat exchanger tubes in the cooking channel, thereby minimizing the length of connecting tubing.

7. The fryer of claim 6 further comprising:
a circulation pump for circulating the thermal fluid at a low pressure that is marginally above ambient;
whereby the high temperature for the thermal fluid is around or about 370° C. (~700° F.) and the intermediate temperature for the cooking oil is around between 200° and 260° C. (~400° and 500° F.).

8. The fryer of claim 6 further comprising:
an expansion chamber or riser pipe for the thermal fluid which is vented to atmosphere at an elevation higher than not only combustion-fired thermal oil heater but also the bed of heat exchanger tubes between the upper and lower runs of the conveyor belt.

* * * * *